US008108998B2

(12) United States Patent
Inada et al.

(10) Patent No.: US 8,108,998 B2
(45) Date of Patent: Feb. 7, 2012

(54) LASER CUTTING METHOD

(75) Inventors: Genji Inada, Kawasaki (JP); Junichiro Iri, Yokohama (JP); Masayuki Nishiwaki, Yoshikawa (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1196 days.

(21) Appl. No.: 11/273,730

(22) Filed: Nov. 14, 2005

(65) Prior Publication Data
US 2006/0113287 A1 Jun. 1, 2006

(30) Foreign Application Priority Data
Nov. 26, 2004 (JP) .................. 2004-342246

(51) Int. Cl.
*H01L 21/78* (2006.01)
*H01L 21/30* (2006.01)
*H01L 21/301* (2006.01)

(52) U.S. Cl. .................... 29/890.1; 219/121.69; 216/27; 438/21; 438/460; 438/463

(58) Field of Classification Search ........... 219/121.67–121.69, 121.72, 121.76, 121.77, 121.85; 438/460, 462, 463, 21; 29/890.1; 216/27; 257/E21.599
See application file for complete search history.

(56) References Cited

U.S. PATENT DOCUMENTS

| 3,604,890 | A | * | 9/1971 | Mullaney et al. | 219/121.67 |
|---|---|---|---|---|---|
| 3,687,345 | A | * | 8/1972 | Carlson et al. | 225/1 |
| 3,942,676 | A | * | 3/1976 | Beckers et al. | 220/270 |
| 4,476,154 | A | * | 10/1984 | Iesaka et al. | 438/438 |
| 4,558,622 | A | * | 12/1985 | Tausheck | 83/885 |
| 4,729,766 | A | * | 3/1988 | Bergentz et al. | 600/36 |
| 5,398,857 | A | * | 3/1995 | Shinozaki et al. | 225/2 |
| 6,099,522 | A | * | 8/2000 | Knopp et al. | 606/10 |
| 6,168,962 | B1 | * | 1/2001 | Itoh et al. | 438/22 |
| 6,211,488 | B1 | * | 4/2001 | Hoekstra et al. | 219/121.72 |
| 6,220,673 | B1 | * | 4/2001 | Russell et al. | 300/21 |
| 6,248,648 | B1 | * | 6/2001 | McKenna et al. | 438/464 |
| 6,286,499 | B1 | * | 9/2001 | Yoshii et al. | 125/12 |
| 6,307,618 | B1 | * | 10/2001 | Suzuki et al. | 355/53 |
| 6,392,683 | B1 | * | 5/2002 | Hayashi | 347/224 |
| 6,488,021 | B1 | * | 12/2002 | Yamane et al. | 125/23.01 |
| 6,744,009 | B1 | * | 6/2004 | Xuan et al. | 219/121.67 |
| 6,787,732 | B1 | * | 9/2004 | Xuan et al. | 219/121.67 |
| 6,992,026 | B2 | * | 1/2006 | Fukuyo et al. | 438/797 |
| 7,033,519 | B2 | * | 4/2006 | Taylor et al. | 216/87 |
| 7,303,932 | B2 | * | 12/2007 | Sakano | 438/33 |
| 7,358,544 | B2 | * | 4/2008 | Sakamoto et al. | 257/103 |
| 7,396,742 | B2 | * | 7/2008 | Fukuyo et al. | 438/463 |
| 7,507,638 | B2 | * | 3/2009 | Mancini et al. | 438/459 |
| 7,626,138 | B2 | * | 12/2009 | Bovatsek et al. | 219/121.69 |
| 2004/0002199 | A1 | | 1/2004 | Fukuyo | |

(Continued)

FOREIGN PATENT DOCUMENTS

| EP | 000369883 | A1 | * | 5/1990 |
|---|---|---|---|---|
| GB | 1549218 | A | * | 7/1979 |
| JP | 361227233 | A | * | 10/1986 |

(Continued)

*Primary Examiner* — Samuel M Heinrich
(74) *Attorney, Agent, or Firm* — Canon U.S.A., Inc. IP Division

(57) ABSTRACT

At least one exemplary embodiment is directed to a laser cutting method where a laser beam is condensed at internal points inside a substrate forming processing regions, and where the laser is swept along a cutting line, where the cutting line is associated with a recess on the substrate and where the recess can be formed contemporaneously with the formation of the processing regions.

10 Claims, 11 Drawing Sheets

U.S. PATENT DOCUMENTS

| | | | |
|---|---|---|---|
| 2004/0137702 A1* | 7/2004 | Iijima et al. | 438/463 |
| 2005/0029109 A1* | 2/2005 | Zhang et al. | 205/118 |
| 2005/0173387 A1 | 8/2005 | Fukuyo | |
| 2005/0181581 A1 | 8/2005 | Fukuyo | |
| 2005/0184037 A1 | 8/2005 | Fukuyo | |
| 2005/0189330 A1 | 9/2005 | Fukuyo | |
| 2005/0194364 A1 | 9/2005 | Fukuyo | |
| 2006/0261050 A1* | 11/2006 | Krishnan et al. | 219/121.74 |
| 2007/0202619 A1* | 8/2007 | Tamura et al. | 438/22 |

FOREIGN PATENT DOCUMENTS

| | | | |
|---|---|---|---|
| JP | 402071546 A | * | 3/1990 |
| JP | 406275713 A | * | 9/1994 |
| JP | 02002029766 A | * | 1/2002 |
| JP | 2002037638 A | * | 2/2002 |
| JP | 2002-192370 A | | 7/2002 |
| JP | 2002-205180 A | | 7/2002 |
| JP | 2003334812 A | * | 11/2003 |

* cited by examiner

LASER CUTTING METHOD

BACKGROUND OF THE INVENTION

1. Field of the Invention

The present invention relates to a cutting method for cutting a workpiece with a laser beam, more particularly, though not exclusively, a laser beam condensed at an internal point of the workpiece.

2. Description of the Related Art

According to a conventional technique for cutting a workpiece (i.e., a member to be cut) with a laser beam, the workpiece such as a semiconductor substrate is cut by rotating, at a high speed, a circular blade having a width of several tens μm to several hundreds μm so that the abrasive material on the blade surface can grind the workpiece (semiconductor substrate). This method is generally referred to as a blade dicing method.

According to this method, to reduce heat generation or abrasion during the cutting operation, one can spray cooling water onto the cut surface. However, according to this method, finely powdered workpiece material or fine particles of the abrasive material generated during the cutting operation may be mixed with the cooling water and may spread in a wide region containing the cut surface.

To solve this problem, conventional systems perform the cutting operation in a dry environment without using cooling water. To this end, to cut a substrate, a processing method using a laser beam having a wavelength highly absorbable by the substrate can be employed to condense the laser beam on the substrate surface. However, according to this method, not only the portion directly irradiated with the laser beam but also its peripheral region on the substrate surface will melt. The electronic devices provided on the semiconductor substrate will be damaged.

On the other hand, there is a conventional processing method using a laser beam highly absorbable by a substrate to condense the laser beam inside the substrate so that the substrate can be cut by utilizing internal beam-condensing of the laser beam. For example, Japanese Patent Application Laid-open No. 2002-192370 and Japanese Patent Application Laid-open No. 2002-205180 discuss a processing method that uses a laser beam having a specific wavelength that shows high permeability relative to a substrate, i.e., a material to be cut, to condense the laser beam at an internal point of the substrate, thereby setting a start point of the cutting operation in a predetermined internal region of the substrate.

This processing method can realize an excellent cutting operation accompanied with less generation of heat or no hardening of dust particles on the surface, because no melt region is formed on the substrate surface.

Furthermore, Japanese Patent Application Laid-open No. 2002-205180 discusses a method for providing a plurality of property modified regions in the incident direction of a laser beam by changing the depth of the beam-condensing point.

However, according to the above-described conventional method, the start point of a cutting operation is limited to an internal region of the substrate where the laser beam is condensed. Hence, it can be difficult to appropriately control the direction or position of a crack growing from the start point of the cutting operation to the substrate surface.

Especially, in a workpiece made of a silicon wafer or a material having a similar crystal structure, the crack tends to grow along the crystal orientation. Therefore, according to the above-described laser processing method, if there is a small offset between a predetermined cutting line and a crystal orientation reaching the substrate surface that may be present due to manufacturing errors in the formation of the silicon substrate or elements, the crack may deviate from the predetermined cutting line in the process of growing toward the substrate surface and, as a result, may damage the logic circuits provided on a semiconductor element region.

SUMMARY OF THE INVENTION

At least one exemplary embodiment is directed to a laser cutting method for forming a crack connecting a surface of a workpiece (i.e., a member to be cut) to an internal processing region formed inside the workpiece while reducing the deviation of the crack from a predetermined cutting line on the workpiece surface.

At least one exemplary embodiment is directed to a laser cutting method configured to cut a workpiece by condensing a laser beam inside the workpiece from a surface of the workpiece to form an internal processing region therein. The laser cutting method includes a step of forming the internal processing region by condensing the laser beam at a predetermined depth from the workpiece surface so that the internal processing region extends in a depth direction of the workpiece, and a step of, along with the step of forming the internal processing region, forming a recessed portion at a position irradiated with the laser beam on the workpiece surface.

Further features of the present invention will become more apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

FIGS. 6A and 6B illustrate diagrams explaining an internal crack forming process, wherein FIG. 6A is a diagram showing a processing apparatus using a laser beam and FIG. 6B is a diagram showing a mechanism for generating an internal crack.

DETAILED DESCRIPTION OF THE EMBODIMENTS

Figure 1A:
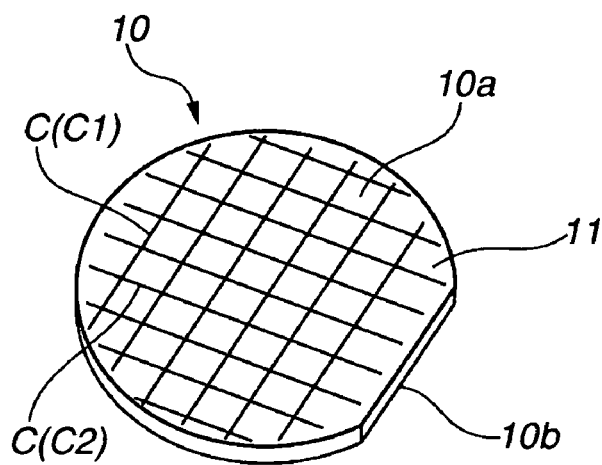
FIG. 1A illustrates a perspective diagram showing a substrate.

The following description of exemplary embodiment(s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example certain lasers and optical lens systems may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is defined in one figure, it may not be discussed for following figures.

Note that the non-limiting illustrative examples that follow discuss the use of a silicon substrate, however exemplary embodiments are not limited to silicon substrates, the substrate can be made of various materials (e.g., SiO2, other substrate materials as known by one of ordinary skill in the relevant art and equivalents).

Hereinafter, exemplary embodiments will be explained using, as a member to be cut, a silicon substrate 10 on which a plurality of semiconductor elements, such as logic elements 10a, are formed. At least one exemplary embodiment proposes a cutting method for splitting the logic elements 10a of the silicon substrate 10 into separate element chips.

In general, the substrate has a front surface and a back surface. A cutting operation of at least one exemplary embodiment can be applied to a silicon substrate 10 having a plurality of semiconductor circuits formed on its front surface and is carried out by irradiating the front surface of the silicon substrate with a laser beam.

Hereinafter, a surface on which the semiconductor circuits are formed is referred to as the front surface of the substrate. However, if simply referred to as a substrate surface, it includes both of the front surface and the back surface of the substrate. Especially, in a case where a workpiece is not differentiated in its front and back surface structures, the cutting method of at least one exemplary embodiment can be applied to the entire surface (e.g., front and back surface) of the substrate.

As shown in FIGS. 1A-1C and 2, a beam-condensing point of the laser beam is positioned inside the silicon substrate 10, at a predetermined depth from the substrate surface 11, to form an internal processing region being spaced from the substrate surface 11 on which logic circuits or other electronic devices are formed. The internal processing region is, for example, a region causing a change in crystal structure of the substrate material, or a softened or melted region, or cracks. According to at least one exemplary embodiment, cracks produced in the silicon substrate 10 facilitate a later-described internal processing operation.

According to at least one exemplary embodiment, a plurality of internal processing regions 12 (12a to 12f, FIG. 2) are formed in a substrate (i.e., a member to be cut). Furthermore, shifting the laser beam relative to the substrate or vice versa can be performed to scan the beam-condensing point along a predetermined cutting line C. With this arrangement, a belt-like crack group is formed along the predetermined cutting line C (refer to FIG. 2).

A surface-processing trace 11a, having a recessed shape, can preexist prior to the formation of the crack group or formed contemporaneously at a laser beam irradiation position on the substrate surface 11 along the predetermined cutting lines C(C1) and CC2) (FIG. 1A).

Then, after the surface-processing trace 11a has been formed and the internal processing operation for forming the cracks (crack group) inside the substrate has been performed, an external force can be applied to the substrate surface to trigger the cutting of element chips.

In this case, the force applied to the substrate surface concentrates on the surface-processing trace 11a. Thus, the surface recess (e.g., the surface-processing trace 11a) and the internal processing region (e.g., the internal processing regions 12, especially an internal crack 12f formed immediately below the surface-processing trace 11a) are easily connected with each other. Thus, an actual cutting line appearing on the substrate surface 11 will not appreciably deviate from the predetermined cutting line C.

In other words, the crack formed on the substrate surface 11 substantially agrees in position with the surface-processing trace 11a (e.g., with the groove bottom).

Such a crack is usually formed along a straight line. However, due to an unexpected chipping caused when the substrate has a crystal defect, the crack may appear along a zigzag line. Even in such a case, the region of the crack appearing on the substrate surface 11 is limited within the width of the recessed surface-processing trace 11a.

This zigzag crack can include short cracks extending along different crystal planes peculiar to the silicon substrate. The region of the zigzag crack can be within the width of the surface-processing trace 11a and is accordingly within the scribe width. Therefore, the actual cutting line does not deviate appreciably (e.g., where appreciably would be where the deviation cuts into a logic circuit) from the predetermined cutting line C.

Figure 1B:
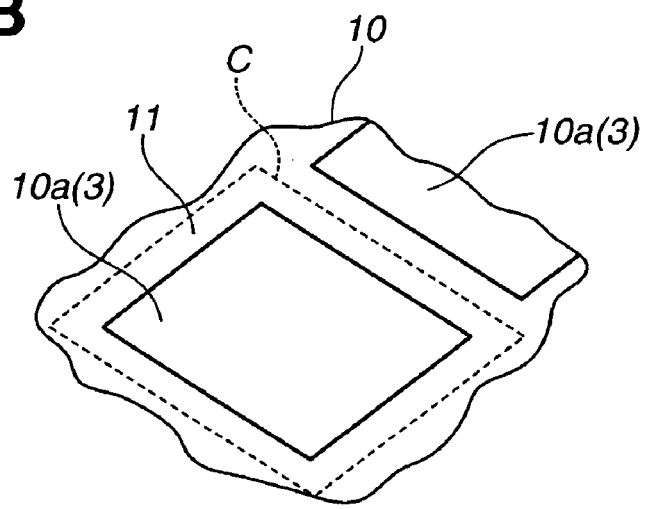
FIG. 1B illustrates an enlarged perspective diagram showing a part of the substrate illustrated in FIG. 1A.
Figure 1C:
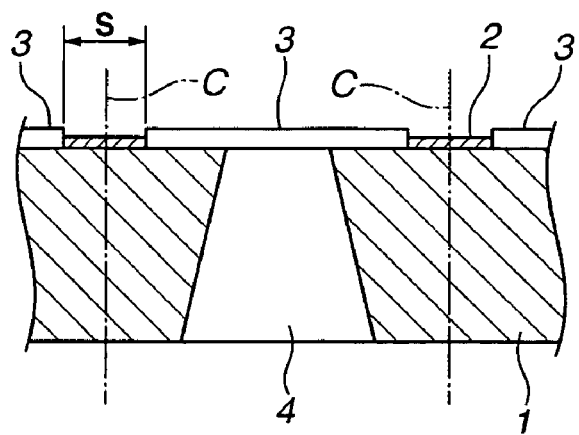
FIG. 1C illustrates a cross-sectional diagram showing the substrate illustrated in FIG. 1B.

FIGS. 1A and 1B illustrate a silicon substrate 10, which has a related thickness (e.g., a thickness of 625 μm). As illustrated in FIG. 1C, a film 2 (e.g., an oxide film) having a related thickness (e.g., about 1 μm) is formed on the (100) crystal surface of a silicon wafer 1. For example, a nozzle layer 3, (e.g., an epoxy resin structural body that includes an ink or liquid discharge mechanism), a logic element (e.g., for driving the discharge mechanism), and its wiring can be disposed on the silicon wafer 1. These members cooperatively constitute each logic element portion 10a.

In the example of a nozzle layer 3, a liquid supply port (i.e., ink supply port) 4, serving as an opening portion, can be formed by applying anisotropic etching to the silicon wafer 1, so that the liquid supply port 4 is positioned beneath the nozzle layer 3 incorporating the liquid discharge mechanism as described above. The nozzle layer 3 can be disposed between two predetermined cutting lines C so that the silicon wafer 1 can be cut into a plurality of element chips in the final stage of the manufacturing process. Each predetermined cutting line C can be formed along a crystal orientation of the silicon wafer 1. In this example a clearance S between neighboring nozzle layers 3 is set to be a particular value (e.g., at least 400 μm).

Figure 2:
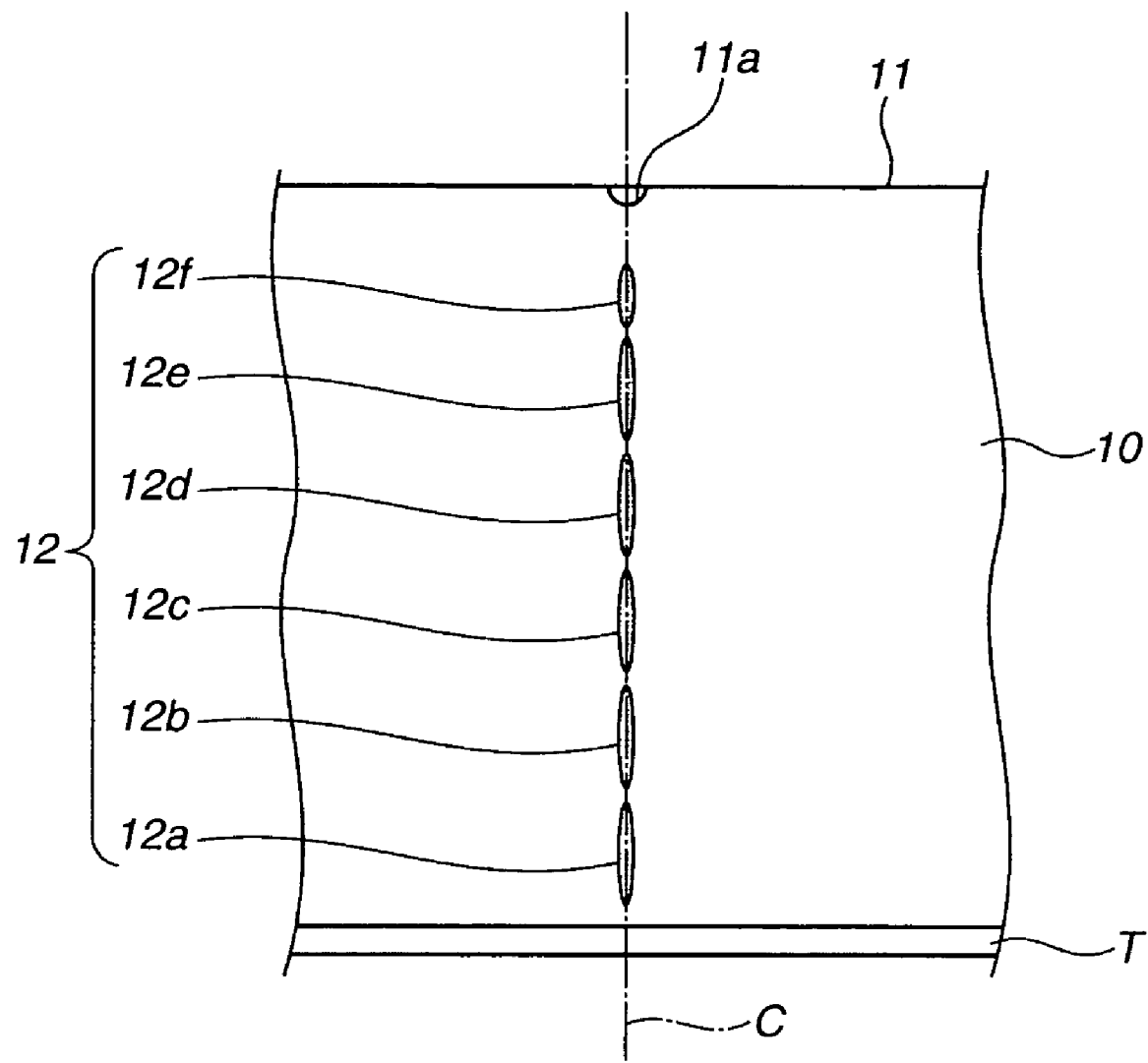
FIG. 2 illustrates a schematic diagram explaining an exemplary embodiment.

FIG. 2 illustrates a cross section of the silicon substrate 10 including the surface-processing trace 1a formed as a recessed portion on the front surface 11 of the silicon substrate 10 together with the internal cracks 12a to 12f disposed, as a plurality of internal processing regions, in the depth direction of the silicon substrate 10 along the predetermined cutting line C. A dicing tape T is bonded to the back surface of the silicon substrate 10.

Figure 3:
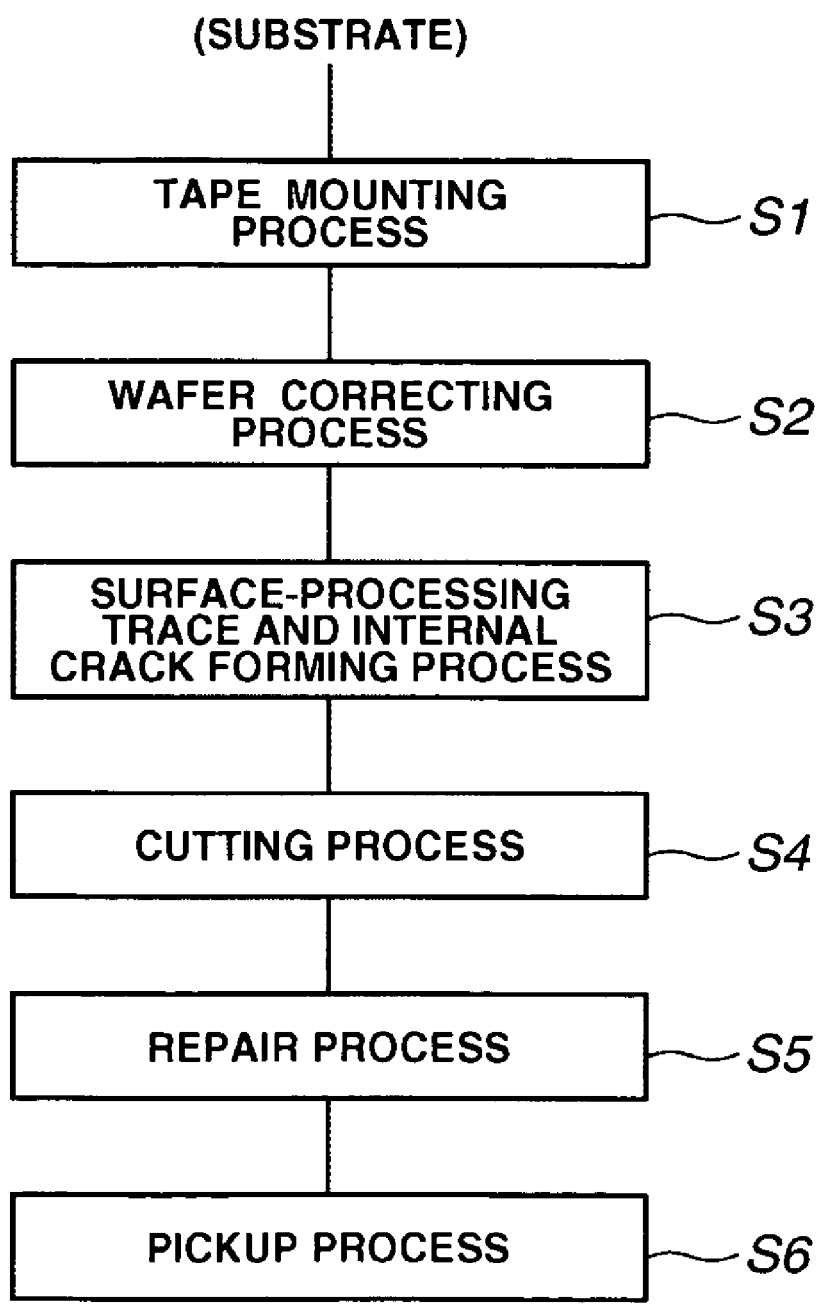
FIG. 3 illustrates a flowchart showing a cutting process in accordance with at least one exemplary embodiment.

FIG. 3 illustrates a flowchart explaining a cutting process for cutting the silicon substrate 10 into a plurality of logic element portions 10a each serving as an individual element chip. The cutting process shown in this flowchart includes a total of 6 processes including a tape mounting process S1 as a first step, a wafer correcting process S2 as a second step, a surface-processing trace and internal crack forming process S3 as a third step, a cutting process S4 as a fourth step, a repair process S5 as a fifth step, and a pickup process S6 as a sixth step, which are performed in this order.

Tape Mounting Process S1

Figure 4:
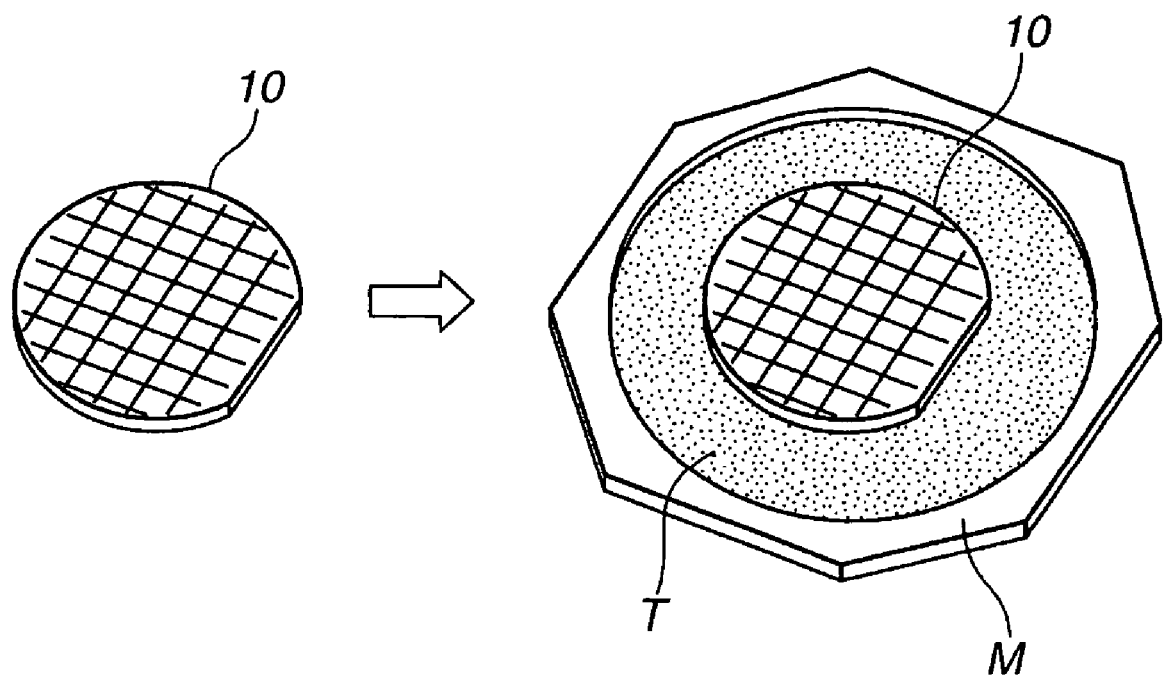
FIG. 4 illustrates a perspective diagram explaining a tape mounting process.

As shown in FIG. 4, the silicon substrate 10 is first subjected to the tape mounting process for the purpose of preventing the elements from being separated before executing the cutting process. The tape mounting process includes a step of bonding a dicing tape T on the back surface of the silicon substrate 10. The dicing tape T can be an adhesive member on which a dicing frame M is attached.

Wafer Correcting (Warpage Correcting) Process S2

Figure 5A:
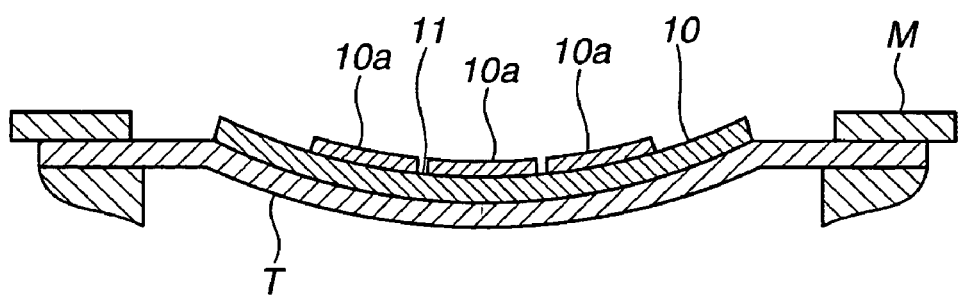
FIGS. 5A and 5B illustrate diagrams explaining a wafer correcting process.

The nozzle layer 3, (e.g., a resin layer formed on the surface of the silicon substrate 10 as described above), can cause heat shrinkage when it is cured. Accordingly, the entire body of the silicon substrate 10 is deformed as shown in FIG. 5A. If a later-described laser irradiation is applied to the deformed silicon substrate 10, it is difficult to accurately perform the processing operation because the incident angle of a laser beam on the substrate surface 11 is different depending on the position of the substrate surface.

Figure 5B:
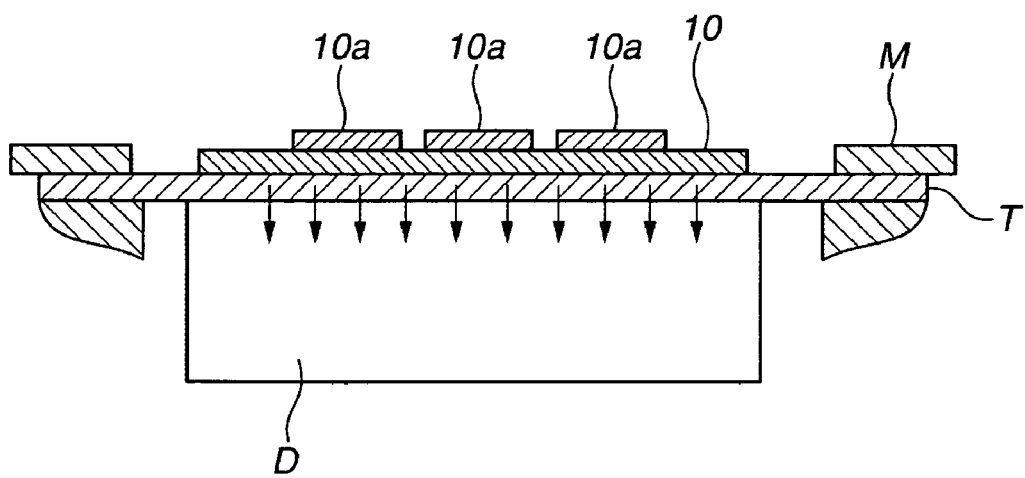

Therefore, one can improve the accuracy of cutting by reducing this deformation beforehand. Hence, as shown in FIG. 5B, a suction stage D can be placed behind the dicing tape T to pull the silicon substrate 10 by vacuum so that the silicon substrate 10 is flattened from the deformed condition.

Surface-Processing Trace and Internal Crack Forming Process S3

Figure 6A:
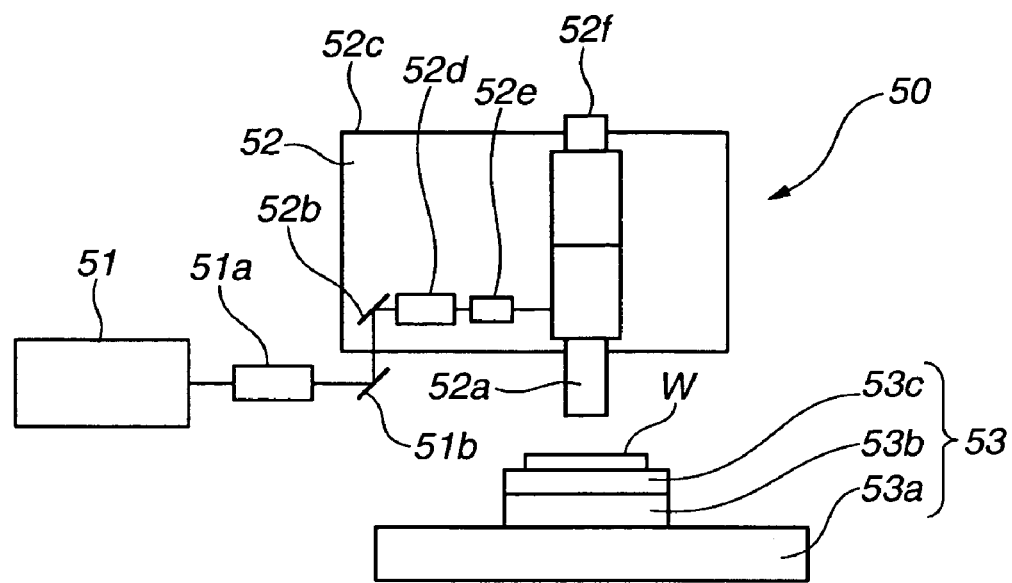

FIG. 6A illustrates a processing apparatus 50 that can form the internal crack 12 shown in FIG. 2. The processing apparatus 50 includes a light source optical system (e.g., 51, 51a, and 51b), a beam-condensing optical system 52, and an automatic stage mechanism 53. The light source optical system includes a light source 51, a beam expanding system 51a, and a mirror 51b. Furthermore, the beam-condensing optical system 52 includes a microscope objective lens 52a, a mirror 52b, and an automatic focusing mechanism 52c.

Furthermore, the automatic stage mechanism 53 includes an X-stage 53a, a Y-stage 53b, and a fine adjustment stage 53c. Furthermore, the processing apparatus 50 includes an alignment optical system (not shown) that can perform alignment of the silicon substrate 10 (i.e., workpiece W) by utilizing an orientation flat 10b (refer to FIG. 1A) formed on the silicon substrate 10.

Furthermore, the light source 51 can be a pulse laser (e.g., YAG laser) having a fundamental wavelength (e.g., of 1,064 nm for the YAG laser), with a pulse width (e.g., ranging from about 15 ns to about 1000 ns) and associated frequencies (e.g., ranging from 10 kHz to 100 kHz).

Note that although in the non-limiting examples that follow a YAG laser is discussed, exemplary embodiments are not limited to YAG lasers and any appropriate laser can be used. Selection of the laser beam should be determined with reference to a spectral transmission factor of the substrate. Therefore, one can use light in a predetermined wavelength region that can form a strong electric field in a beam-condensing point and is permeable into a substrate. For example, the fundamental wave of the pulse YAG laser beam used in the example of exemplary embodiments may not penetrate the entire body of the silicon substrate, depending upon the substrate thickness, and may not completely absorbed on the surface of the silicon substrate.

Figure 6B:
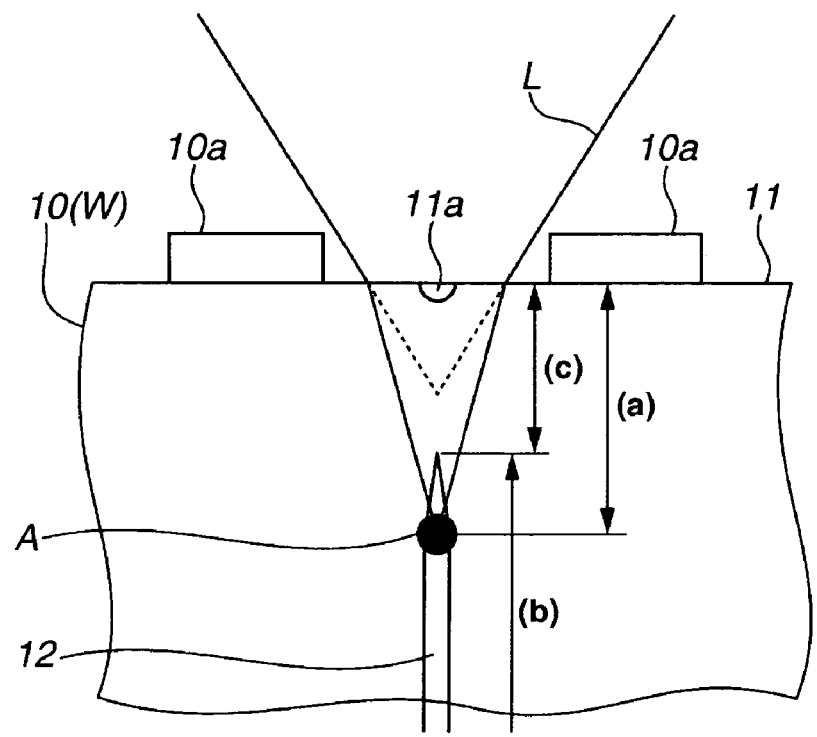

A laser beam L emitted from the light source 51 passes through the beam expanding system 51a and enters the beam-condensing optical system 52. Then, the microscope objective lens 52a of the beam-condensing optical system 52 condenses the laser beam L at the workpiece W. Then, as shown in FIG. 6B, the laser beam L enters the workpiece W, via the substrate surface 11 on which the logic element portions 10a are formed, the silicon substrate 10 being the workpiece W mounted on the automatic stage 53.

The optical conditions in this case should be set in such a manner that the surface-processing trace 11a can be present anywhere on the substrate surface 11. In at least one exemplary embodiment the power can be increased in compensation of the energy loss of the processing laser beam L caused by the surface-processing trace 11a, or one can select a light flux that can enter the substrate 10 without interfering with the surface-processing trace 11a. In this manner, the light flux entering the silicon substrate 10 via the substrate surface 11 causes a refraction in the silicon substrate 10 and is condensed at a beam-condensing point A spaced by a predetermined depth (a) from the substrate surface 11 so as to form the internal crack 12, which can include the beam-condensing point A.

In at least one exemplary embodiment the processing conditions are set considering the beam-condensing position, film arrangement of film 2 (e.g., oxide film), or the wavelength of a laser beam used, so that the crack edge of an uppermost internal crack 12f as shown in FIG. 2 is spaced by a chosen distance (e.g., of 10 μm or more) from the substrate surface 11. This setting can be used to reduce the occurrence of the internal crack 12f connecting with the substrate surface 11 or with the surface-processing trace 11a (when the surface-processing trace 11a is being formed or after the surface-processing trace 11a is already formed) during the processing operation. Furthermore, the substrate surface 11 may be damaged if laser irradiation conditions are improper.

The depth (a) of the beam-condensing point A can be controlled by shifting either the workpiece W (e.g., the silicon substrate 10) or the beam-condensing optical system 52 in the optical axis direction, so that the beam-condensing position can be changed.

When 'n' represents the refractivity of the substrate 10 relative to a particular wavelength (e.g., 1064 nm) and 'd' represents a mechanical shift amount (e.g., the shift amount of either the silicon substrate 10 or the laser beam condensing optical system 52 when it is shifted in the optical axis direction), an optical shift amount of the beam-condensing point A can be expressed by a product of 'n' and 'd' (i.e., nd). The refractivity 'n' of the silicon substrate 10 is approximately 3.5 relative to the wavelength 1.1 μm to 1.5 μm. The comparison with an experimentally measured refractivity has revealed that 'n' is close to 3.5. For example, when the mechanical shift amount is 100 μm, the beam-condensing point of the laser beam is formed in a position at the depth of 350 μm from the substrate surface.

Furthermore, having the refractivity of approximately 3.5 is equivalent to having a large reflectance. In general, as the reflection in a vertical incidence is expressed by $((n-1)/(n+1))^2$, the silicon substrate 10 has the reflectance of approximately 30%. Theoretically, the rest of the energy can reach the beam-condensing point inside the silicon substrate. However, if the light absorption by the silicon substrate 10 itself is taken into consideration, the final energy available at the beam-condensing point A will be smaller than the theoretical value. According to an experimental measurement using a silicon substrate having a thickness of 625 μm, the transmission factor was approximately 20%.

When the laser beam L is condensed at the beam-condensing point A, a local change in crystal condition of the silicon can occur and, as a result, an internal crack 12 can be formed. According to experimental results, the crack length (b) was approximately 2 μm to 100 μm, which can depend upon beam-condensing intensity.

In this manner, the internal crack 12 is formed from an internal point inside the silicon substrate 10. The internal processing operation can be performed, just beneath the predetermined cutting line C, by relatively shifting the beam-condensing point A along the predetermined cutting line C. As shown in FIG. 1A, the predetermined cutting lines C formed on the silicon substrate 10 include two kinds of cutting lines C(C1) and C(C2) that are substantially perpendicular to each other. The cutting line C(C1) is substantially parallel to the orientation flat 10b formed as a reference on the silicon substrate 10. The cutting line C(C2) is substantially perpendicular to the orientation flat 10b.

The workpiece W (e.g., the silicon substrate 10) can be mounted on the automatic stage 53 that is shiftable in the X and Y directions. Therefore, the positional adjustment of the workpiece W in the horizontal plane is feasible. On the other hand, to realize the positional adjustment of the workpiece W in the optical axis direction (i.e., the Z direction or the depth direction of the silicon substrate), it is possible to provide a Z-stage 53c, on the automatic stage 53 or on the beam-condensing optical system 52, that is capable of relatively shifting the automatic stage 53 in the Z direction. Thus, the clearance between the beam-condensing optical system 52 and the workpiece W is changeable.

The shifting speed in the X and Y directions can be determined considering the frequency or crack configuration. For example, the shifting speed can be in the range from 10 mm/sec to 100 mm/sec when the frequency is in the range from 10 kHz to 100 kHz. If the shifting speed exceeds 100 mm/sec, the internal processing regions will be formed at relatively long intervals in the shifting direction. Thus, the clearance between neighboring cracks formed along the same predetermined cutting line will become excessively wider in the depth direction. This can adversely affect the later-performed cutting operation.

Furthermore, the beam-condensing optical system 52 can include an observation camera 52f, which can be equipped with a filter suitable for the laser output, which is disposed in a conjugated relationship with a workpiece irradiation point. The illumination for the observation uses a relay lens so that an illuminating light source is formed at the position of an entrance pupil of the microscope objective lens 52a used for the beam-condensing, for example in at least one exemplary embodiment the arrangement can form a Koehler illuminating system.

In addition to the above-described observation optical system, an AF (i.e., Auto Focus) optical system (not shown) can be provided to measure the clearance between the system and the workpiece W. The AF optical system can obtain the contrast of an image when it is taken by the observation camera 52f, and can also measures the focusing point or the inclination based on the obtained contrast. To measure this contrast in an actual operation, one can repeat a fine feeding operation to measure the distance from the workpiece W, so that an optimum position can be determined. The usage of such an AF action can also be used to determine the parallelization of the workpiece W orientation (e.g., the silicon substrate 10).

In starting the internal processing operation, the following points should be considered.

Figure 7:
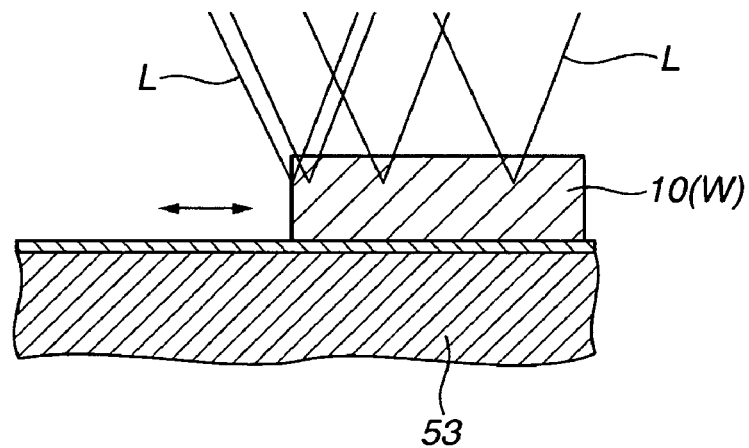
FIG. 7 illustrates a cross-sectional diagram explaining an internal crack formation at an end region of the substrate.

(1) As shown in FIG. 7, the laser processing operation starts from the end point of the silicon substrate 10 being the workpiece W. In this case, the region near the end point is generally difficult to process compared with the central region. Hence, in accordance with at least one exemplary embodiment, the processing conditions can be changed so as to increase the laser energy when the region near the end point is processed.

Figure 8:
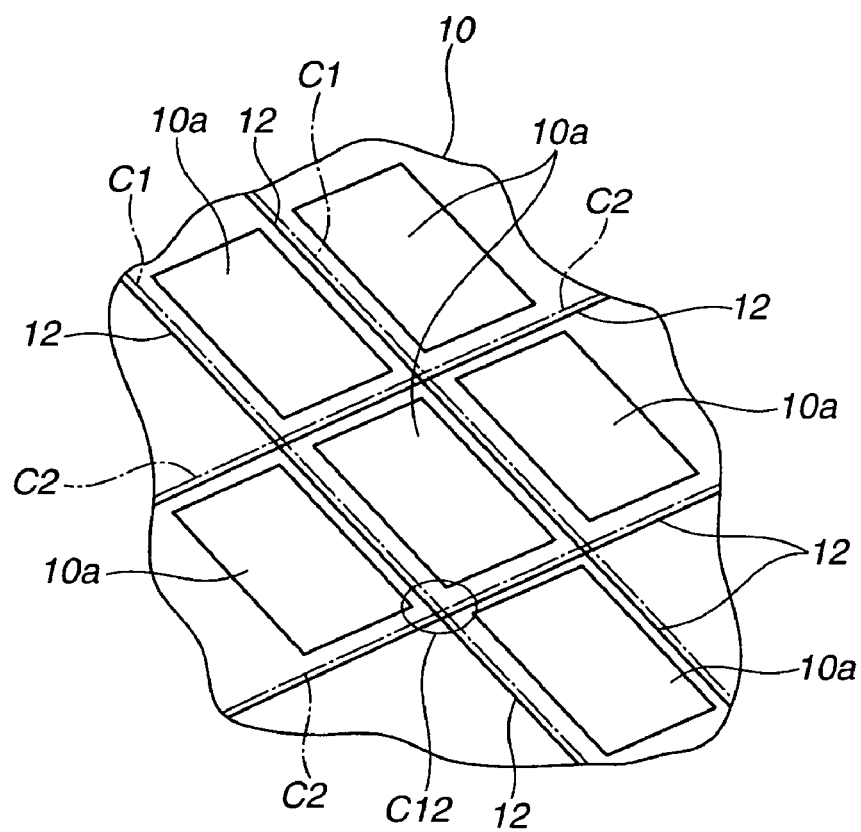
FIG. 8 illustrates a perspective diagram explaining cutting of a substrate into a plurality of rectangular element chips.

(2) Furthermore, in the example where the substrate is cut into a plurality of rectangular chips as shown in FIG. 8, the predetermined cutting line C(C1) extending along the longer side of the chip is regarded as a first cutting direction and the internal crack 12 is formed along this line C1. Then, another internal crack 12 is formed along the predetermined cutting line C(C2) extending along the shorter side of the chip, which is regarded as a second cutting direction.

As described above, in the non-limiting example discussed herein, the crack length formed at one beam-condensing point is in the range from 2 μm to 100 μm. Meanwhile, the silicon substrate in this particular example has a thickness of 625 μm. Hence, to complete the cutting of this silicon substrate 10, one can repeatedly perform the internal processing operation. Furthermore, regarding the order of the internal processing operation performed at one laser beam incident point, the internal processing operation can start with the far side (e.g., the inner side close to the back surface of the substrate 10) and ends with the near side close to the front surface of the substrate 10. This arrangement facilitates preventing the already formed internal processing region from interfering with the laser beam.

Furthermore, damage of the element chips disposed on the substrate surface can be reduced. The internal processing operation for forming internal cracks, in accordance with at least one exemplary embodiment, is constructed to facilitate the reduction of the occurrence of an internal crack, formed adjacent to the substrate surface, from reaching the substrate surface 11. Furthermore, the processing conditions can be carefully determined to reduce the occurrence of an internal crack already existing in the vicinity of the beam-condensing point from developing due to laser irradiation heat and reaching the substrate surface.

However, in at least one exemplary embodiment the crack 12a can reach the surface of the back surface of the substrate 10. As shown in FIG. 2, a plurality of internal cracks 12a to 12f disposed in the depth direction can be formed. Alternatively, the internal cracks 12a to 12f can merge with each other. Furthermore, the uppermost internal crack 12f closest to the substrate surface 11 can be positioned at a chosen depth (e.g., the depth of 10 μm to 100 μm) from the substrate surface 11 of the silicon substrate 10 (refer to the distance (c) shown in FIG. 6B). In addition, in at least one exemplary embodiment the internal crack 12f is not connected with the surface-processing trace 11a.

A method for forming the surface-processing trace 11a on the substrate surface 11 to accurately perform the operation for cutting the silicon substrate 10 into a plurality of logic element portions will now be described below. The surface-processing trace 11a facilitates propagation of a crack along the predetermined cutting line C.

According to at least one exemplary embodiment, the surface-processing trace 11a can be formed on the substrate surface 11 contemporaneously with the internal crack 12f closest to the substrate surface 11 at about the time the internal crack 12f is formed in the substrate or prior to the internal crack 12f formation. To this end, the depth of the laser beam-condensing point inside the substrate 10 is determined to be an appropriate value that is aligned with the surface-processing trace 11a. Thus, the timing of forming the surface-processing trace 11a is not limited to the timing of forming the internal crack 12f closest to the substrate surface.

For example, depending on the laser beam irradiation conditions, the surface-processing trace 11a may be formed not only when the internal crack 12f is formed but also when the internal crack 12e is formed or before any crack is formed. In other words, the surface-processing trace 11a can be formed when the laser beam irradiation for forming a plurality of internal cracks, e.g., the formation of the internal crack closest to the front substrate surface and the formation of another internal crack positioned closer to the back surface of the substrate, is performed.

Figure 9A:
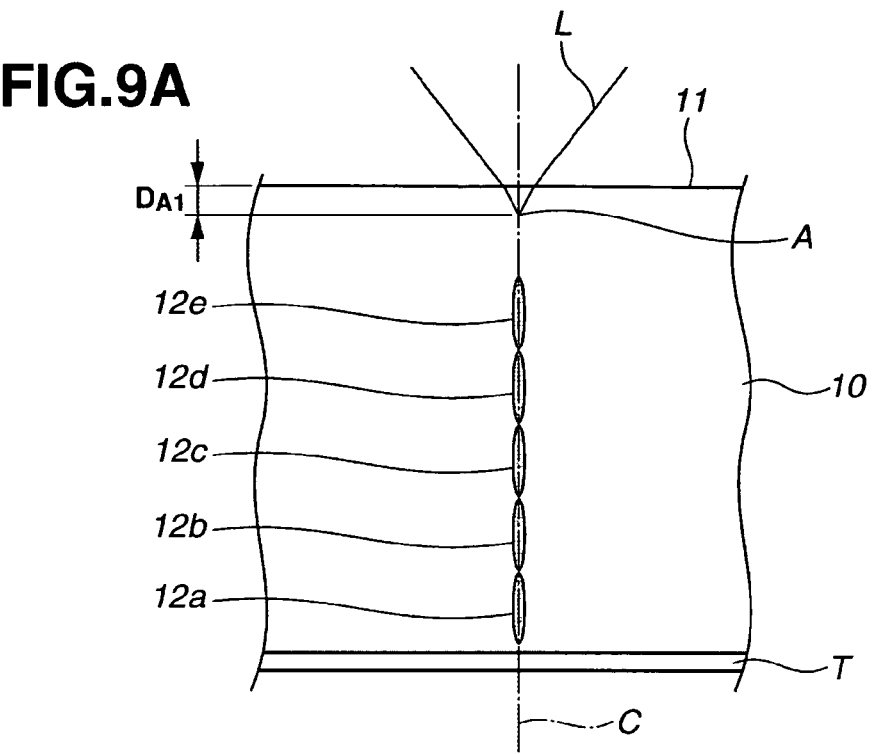
FIGS. 9A and 9B illustrate cross-sectional diagrams explaining a laser scanning method for forming a surface-processing trace and internal cracks differing in depth.

Regarding the forming order of the internal cracks 12a to 12f, as shown in FIG. 9A, it is possible to form many layers (e.g., a total of 5 layers) of internal cracks (e.g., 12a to 12e) before forming the internal crack 12f. Alternatively, it is possible to successively form the remaining internal cracks 12e to 12a in this order after simultaneously forming the internal crack 12f and the surface-processing trace 11a. Thus various exemplary embodiments can have various orders of crack layer formation.

The length of each crack in the depth direction is variable (e.g., approximately 60 µm to approximately 70 µm). To form these internal cracks, the depth of the beam-condensing point from the substrate surface 11 can be successively changed at chosen intervals (e.g., of 95 µm). The clearance between neighboring internal cracks can be kept by appropriately determining the depth of the beam-condensing point. In the example, the internal crack 12a formed at the deepest position (i.e., the position closest to the back surface of the substrate) is spaced by approximately 50 µm, at its end, from the back surface of the substrate, although other spacing can be chosen for other exemplary embodiments and examples.

The driving conditions of the laser processing apparatus for contemporaneously forming the internal crack 12f and the surface-processing trace 11a according to at least one exemplary embodiment were as follows (processing example A)

Figure 9B:
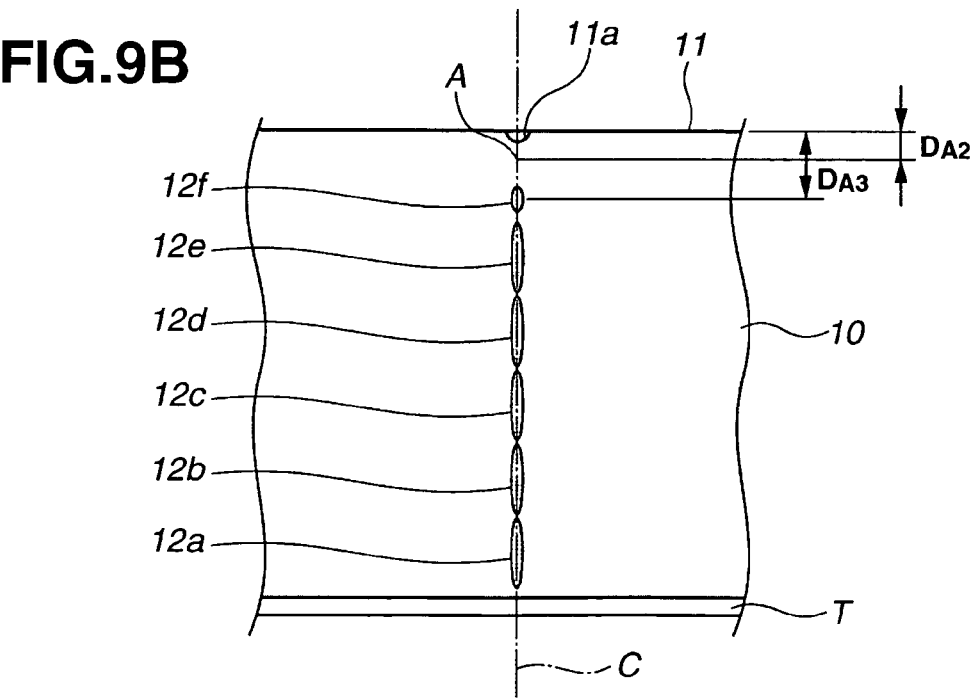

Frequency: 100 kHz
Pulse width: 70 nsec
Shifting speed of Laser beam irradiation position: 100 mm/sec
Output: 10 µJ Under such conditions, the internal processing region (e.g., the internal crack) was formed by setting the beam-condensing point A positioned closest to the substrate surface 11 at the depth of 25 µm (e.g., $D_{A1}$ and $D_{A2}$) from the substrate surface 11. As a result, the internal processing region (i.e., internal crack region) 12f having the length of approximately 10 µm to approximately 20 µm in the depth direction was obtained. The center of this crack was positioned at the depth of approximately 45 µm to approximately 50 µm (e.g., $D_{A3}$) from the substrate surface 11. In other words, the formed internal crack had its center being positioned at the point deeper than the depth of the beam-condensing point A (FIG. 9B).

Contemporaneously, the surface-processing trace 11a can be formed on the substrate surface 11 along the predetermined cutting line C. The formed surface-processing trace 11a can have a groove having a width (e.g., of approximately 5 µm to approximately 10 µm) and a depth (e.g., of approximately 3 µm to approximately 5 µm) (refer to FIG. 9B). In this manner, appropriately setting the laser beam irradiation conditions for forming the internal processing region makes it possible to contemporaneously form the surface-processing trace 11a together with the internal processing region. Thus, the surface-processing trace 11a can be obtained by utilizing the laser beam irradiation that is performed to form the internal processing region. In at least one exemplary embodiment, the surface-processing trace 11a can be formed before the cracks.

In at least one exemplary embodiment, the beam-condensing point depth of the laser beam, in forming the internal processing region 12f, is determined depending on the selection of the laser processing apparatus, a laser oscillator, and a workpiece, so that the surface-processing trace 11a and the internal processing region 12f can be simultaneously formed.

Results in accordance with a method in accordance with at least one exemplary embodiment are provided below. The results of such processing operations performed by changing the depth of the beam-condensing point to form the internal crack 12f closest to the substrate surface are given by way of example and are:

Depth: 0 µm . . . only the surface-processing trace was formed.
Depth: 25 µm . . . the surface-processing trace was formed together with the internal crack (processing example A, refer to FIG. 9B).
Depth: 45 µm . . . the surface-processing trace was formed together with the internal crack (processing example B).
Depth: 80 µm . . . only the internal crack was formed.

According to the above-described processing example B, the internal crack region was formed with its center being positioned at the depth of approximately 60 µm and the length of approximately 20 µm to approximately 30 µm.

From these results, the following information can be obtained. First, one should select a single laser beam wavelength that cannot penetrate the entire body of the silicon substrate for a given thickness and is not completely absorbed on the surface. Second, one should select appropriate laser processing conditions, such as a beam-condensing point depth, with reference to the reflection or absorption of a laser beam that may be changed according to the film characteristics of a substrate surface via which the laser beam enters the substrate body.

When such irradiation conditions are satisfied, the surface-processing trace and the internal crack of the silicon substrate can be contemporaneously formed. Thus in such an exemplary embodiment, it becomes possible to omit the process of scribing a groove with a scriber along a predetermined cutting line C on a substrate surface.

In the operation for contemporaneously processing the surface-processing trace and the internal crack, a threshold value of the energy for processing a silicon surface is smaller than a threshold value of the energy for forming the internal crack in the silicon substrate. This is one reason why such processing operations are feasible. The energy relationship described above has been confirmed by experimentation with respect to the example discussed above. Thus, experimentally it was confirmed, for the example discussed, that the output for forming the internal crack in the silicon substrate 10 was several times the energy for processing a silicon surface 11. For example, according to the above-described processing example A, the laser beam energy on the substrate surface has exceeded a processing threshold value in the process of condensing the laser beam at the depth of 25 µm and the laser beam energy was partly used for a surface processing operation for forming the surface-processing trace.

Figure 10:
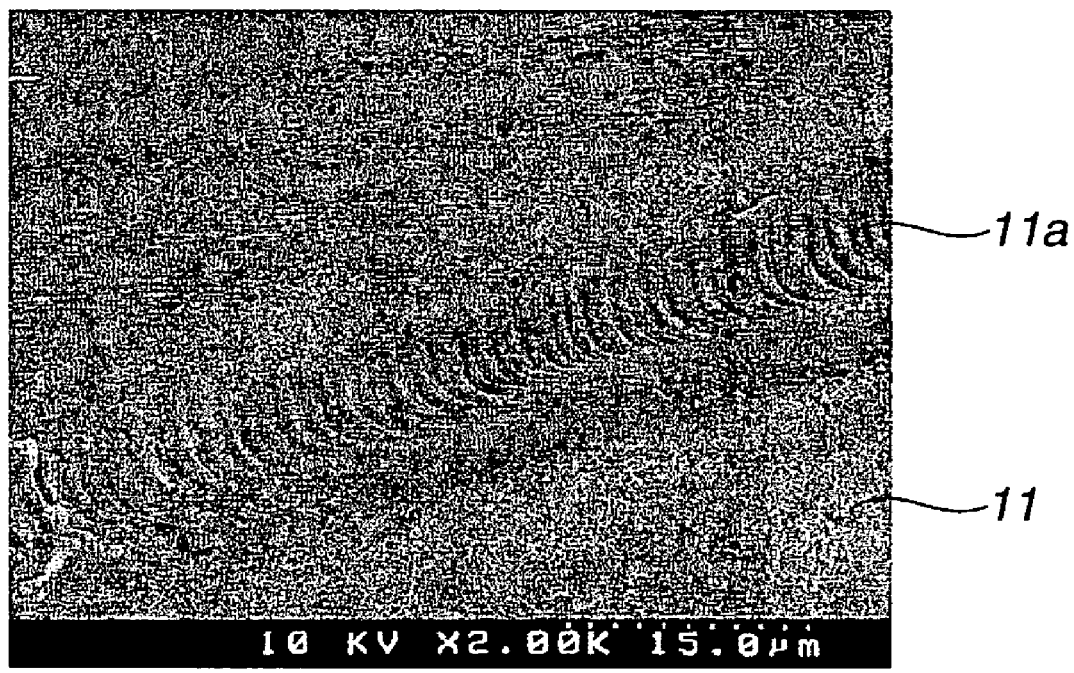
FIG. 10 illustrates an electron microscope photograph showing the surface-processing trace formed contemporaneously with the internal cracks.

FIG. 10 illustrates an electron microscope photograph showing one example of the surface-processing trace 11a formed together with the internal cracks. Changing the laser beam oscillating conditions makes it possible to contemporaneously change the conditions of the internal processing operation as well as the conditions of the surface processing operation. For example, the following results were obtained when the pulse width is set to 17 µm based on the processing system of the processing example A or B, without changing other conditions.

Depth: 0 µm . . . only the surface-processing trace was formed.
Depth: 25 µm . . . only the surface-processing trace was formed.
Depth: 45 µm . . . the surface-processing trace was formed together with the internal crack.
Depth: 80 µm . . . only the internal crack was formed.

The surface-processing trace 11a, obtained together with the internal crack 12 in the above-described experiment, was connected to the internal crack 12 in a later-described cutting process. Thus, it becomes possible to realize a substrate cutting operation that reduces undesirable cracks that may deviate from the predetermined cutting line C. The undesirable cracks in this case include a crack that may damage an element chip disposed near the predetermined cutting line C.

Furthermore, in the process of contemporaneously forming the surface-processing trace 11a and the internal processing region the beam-condensing point depth for forming the internal processing region closest to the substrate surface should be determined carefully, so as to reduce the occurrence of the surface-processing trace and the internal crack region from being connected with each other via the crack, (i.e., the internal crack region) of the substrate.

Cutting Process S4

According to at least one exemplary embodiment, in the silicon substrate 10 in which the surface-processing trace 11a and a plurality of internal cracks 12a to 12f are formed along the predetermined cutting line C, the surface-processing trace 11a is not connected with the internal crack 12f positioned beneath the substrate surface 11. Therefore, at the time immediately after the laser processing operation is accomplished, the logic element portions 10a of the silicon substrate 10 are not cut yet. Hence, cutting the silicon substrate 10 into a plurality of element chips is carried out next in the following manner.

Figure 11A:
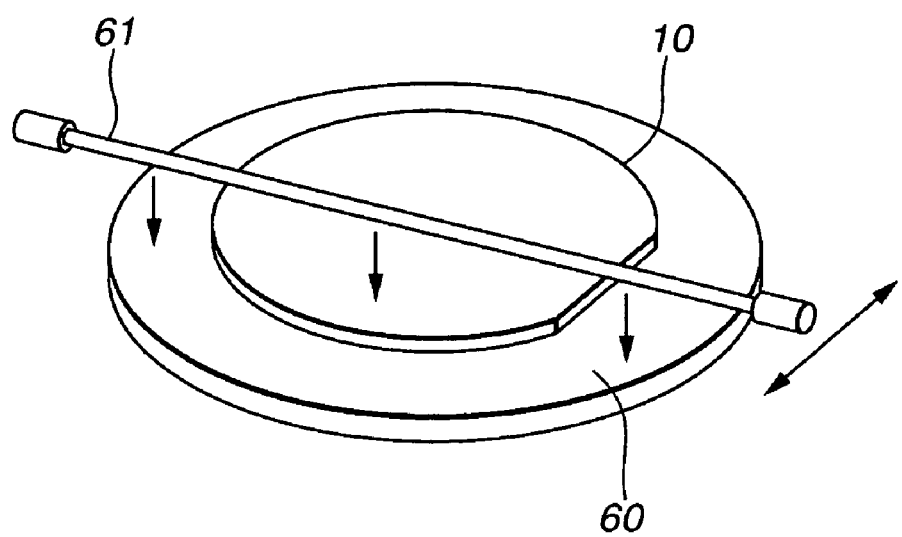
FIGS. 11A and 11B illustrate diagrams explaining a cutting operation using a roller.

For example, as shown in FIG. 11A, after the formation of the surface-processing trace 11a and the internal crack 12 (e.g., 12a, 12b, 12c) is accomplished, the silicon substrate 10 is placed upside down on an elastic rubber sheet 60 of the cutting apparatus while the silicon substrate 10 is mounted on the dicing tape T. The elastic rubber sheet 60 is, for example, a silicon rubber or a fluorocarbon rubber. Next, the operation for cutting the silicon substrate 10 into element chips is carried out by applying a pressing force, from the back surface, to the silicon substrate 10 via the dicing tape T with a stainless roller 61 or other pressure device as know by one of ordinary skill in the relevant art and equivalents.

Figure 11B:
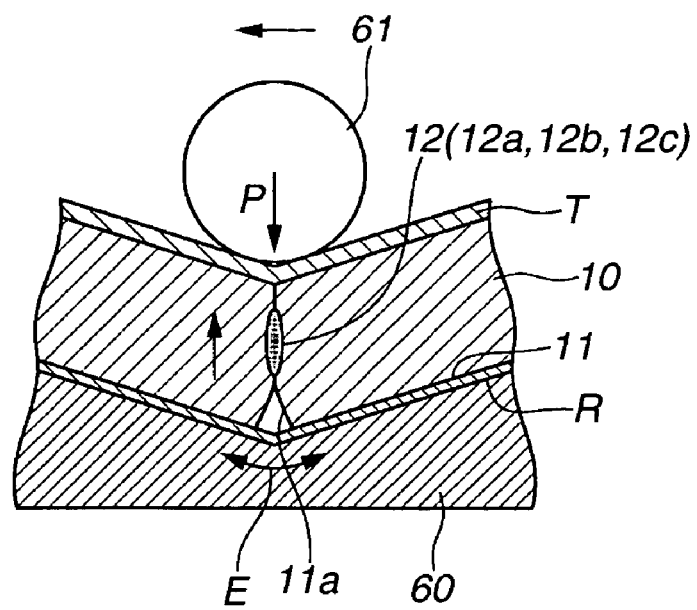

More specifically, as shown in FIG. 11B, the silicon substrate 10 is mounted on the rubber sheet 60 together with a protecting tape R that is bonded to the front surface of the substrate surface 11 to protect the substrate surface 11, in such a manner that one predetermined cutting line C, for example the above-described first cutting direction, becomes parallel to a shaft of the stainless roller 61. Next, a pressing force P is applied to the silicon substrate 10 with the roller 61 being rotated. The rubber sheet 60 positioned beneath the roller 61 is then deformed downward. The silicon substrate 10 receives an expansion force E acting along its front surface, e.g., the surface closer to the rubber sheet 60. This expansion force E concentrates on a weakest portion of the substrate surface 11, e.g., the surface-processing trace 11a formed along the predetermined cutting line C1.

Accordingly, the groove of the surface-processing trace 11a is forcibly widened in its width direction by the expansion force E applied by the roller 61. Thus, the growth of a crack starts from the surface-processing trace 11a on the front surface and propagates toward the back surface by successively connecting the internal cracks 12f, 12e, 12d, 12c, 12b, and 12a formed by the laser irradiation applied in the substrate. When the crack reaches the back surface, the silicon substrate 10 is cut into two pieces along the predetermined cutting line C1. In general, the growth of a crack occurs along a crystal orientation of the silicon substrate 10. However, the above cutting operation is triggered by the surface-processing trace 11a. Thus, the formed crack does not deviate appreciably from the predetermined cutting line C1 on the substrate surface 11.

According to the processing example A, there was appreciably no positional difference between the surface-processing trace 11a and the internal crack 12f in the direction parallel to the substrate surface. Therefore, in the cutting operation, the surface-processing trace 11a became a start point or one end of a crack that can be surely connected to the closest internal crack 12f positioned beneath the surface-processing trace 11a. Furthermore, the connection between the internal crack 12f and the internal crack 12e and the connection between the internal crack 12e and the internal crack 12d successively occurred.

As a result, the crack growth was approximately linearly propagated via the internal cracks sequentially disposed in the depth direction toward the back surface. Finally, a linear crack was formed from the internal crack 12a to the back surface. As a result, the cut surface of the substrate was formed to extend along the predetermined cutting line substantially in parallel with the incident optical axis of the laser beam relative to the substrate. Furthermore, when the incident angle of the laser beam was substantially perpendicular to the substrate surface, the obtained cut surface was substantially perpendicular to the substrate surface.

Furthermore, on the substrate surface, the crack did not deviate appreciably from the surface-processing trace 11a.

After the cutting operation is accomplished in the first cutting direction, the silicon substrate 10 is rotated by 90 degrees. Then, like the cutting operation performed along the first cutting direction, a pressing force is applied to the silicon substrate 10 with the roller 61 being rotated, thereby producing a crack which grows in the second cutting direction from the surface-processing trace 11a and reaching the back surface of the silicon substrate 10.

Through the above processes, the silicon substrate 10 is split into a plurality of element chips.

Repair Process S5

Figure 12A:
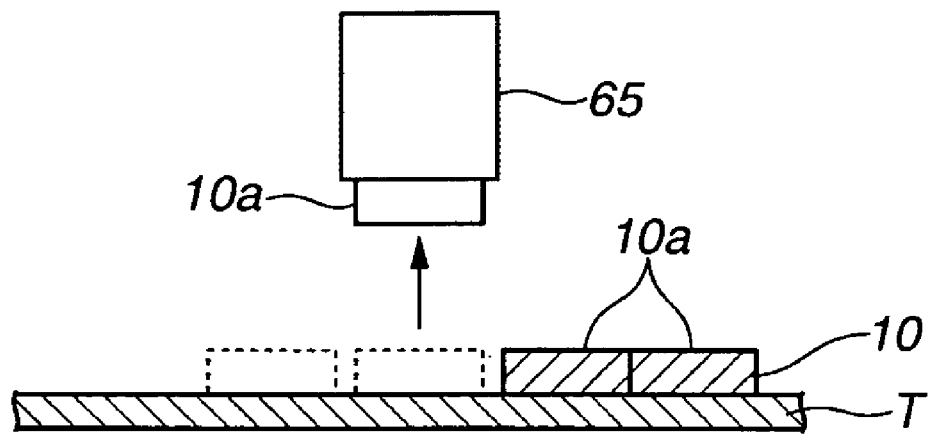
FIGS. 12A and 12B illustrate diagrams explaining a repair process and a pickup process.
Figure 12B:
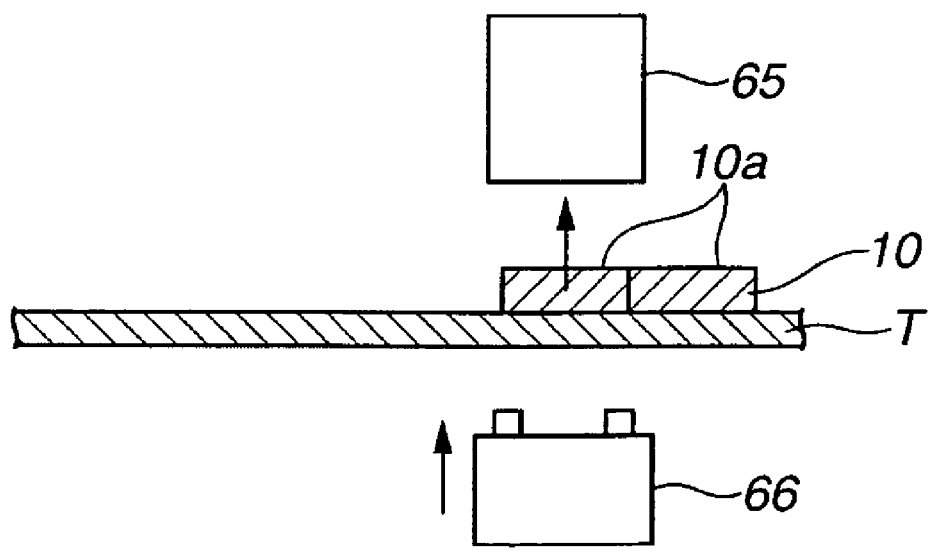

The crack formed in the above-described cutting process can connect the surface-processing trace 11a with the internal crack 12 and can also grow inward to reach the back surface, thereby surely separating the silicon substrate 10 into individual element chips. However, if there is a portion that is not completely separated, one can perform the cutting operation again. As a method for performing such an additional cutting operation, it is possible to use a mechanism including, for example, a suction collet 65 and a pickup pin 66 as shown in FIGS. 12A and 12B. According to this mechanism, a pressing force is selectively applied to individual logic element portions 10a that are not split yet, thereby completely accomplishing the cutting operation.

Pickup Process S6

The logic element portion 10a that has been split as an independent element chip through the above-described cutting process S4 and the repair process S5 is then conveyed by the suction collet 65 and the pickup pin 66 as shown in FIGS. 12A and 12B and is separately stored. In this case, an expander can be used to widen the clearance between the element portions 10a before picking up them, so that the storage of each element portion 10a can be surely carried out.

Furthermore, sucking and removing the fine dusts generated during the pickup operation can be performed to minimize contamination that can result in the malfunction of circuits formed on each element portion 10a.

According to the above-described exemplary embodiment, by appropriately setting the laser beam condensing point positioned in a workpiece, a recessed portion can be simultaneously formed on the surface of the workpiece in the process of forming an internal processing region inside the workpiece. Thus, at least one exemplary embodiment requires no independent process for forming such a recessed portion on the workpiece.

Furthermore, the contemporaneous formation of a recess portion and an internal processing region, can result in there not being a substantial horizontal positional difference between the two.

Furthermore, by connecting the internal processing region and the recessed portion with a crack growing between them, a reliable cutting operation can be performed which is configured to reduce a cut surface from deviating from a predetermined cutting line.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures, and functions.

This application claims priority from Japanese Patent Application No. 2004-342246 filed Nov. 26, 2004, which is hereby incorporated by reference herein in its entirety.

What is claimed is:

1. A method for splitting a workpiece on a wafer comprising:
   irradiating a laser beam to the workpiece to form a recessed portion at a surface of the workpiece and condensing the laser beam at predetermined depth at a position away from the recessed portion in the workpiece to form an internal processing region including a condensing point having a depth;
   splitting the workpiece by applying an external force to the workpiece to generate a crack along a first cutting line and second cutting line connecting the recessed portion with the internal processing region; and
   applying etching to the wafer to form a supply port positioned beneath a nozzle layer, the nozzle layer being disposed between the first cutting line and the second cutting line.

2. The method according to claim 1, wherein the laser beam has a wavelength such that the laser beam passes through a laser beam receiving surface of the workpiece and enters the workpiece but does not exit from a back surface of the workpiece.

3. The method according to claim 1, wherein the predetermined depth is a condensing position of the laser beam that forms an internal processing region that is not connected via a crack to the recessed portion.

4. The method according to claim 1, wherein the internal processing region includes a plurality of processing regions formed inside the workpiece serially in a depth direction of the workpiece.

5. The method according to claim 1, wherein the internal region includes a plurality of processing regions formed inside the workpiece serially from a position a first predetermined distance from a front surface of the workpiece to a position a second predetermined distance to the front surface of the workpiece.

6. The method according to claim 1, further comprising:
   applying a second external force to the workpiece to generate a crack connecting the recessed portion on the surface of the workpiece with the internal processing region, thereby substantially cutting the workpiece in a second direction, wherein the second direction intersects the first direction, and where the workpiece is separated into a number of subpieces, wherein a substantial number of subpieces are cut from the workpiece.

7. The method according to claim 6, wherein the first direction and the second direction are substantially orthogonal to each other.

8. The method according to claim 7, further comprising:
   identifying subpieces not cut from the workpiece; and
   applying a pressing force to the identified subpieces not cut from the workpiece, wherein the pressing force cuts the identified subpieces from the workpiece.

9. The method according to claim 7, wherein the external force and the second external force are applied to the surface of the workpiece opposite the surface having the recessed portion.

10. The method according to claim 1, wherein the workpiece is a silicon substrate of the wafer.

* * * * *